Dec. 4, 1923.
A. L. KRONQUEST
SOLDERING MECHANISM FOR CANS
Filed April 26, 1922
1,476,405
2 Sheets-Sheet 1
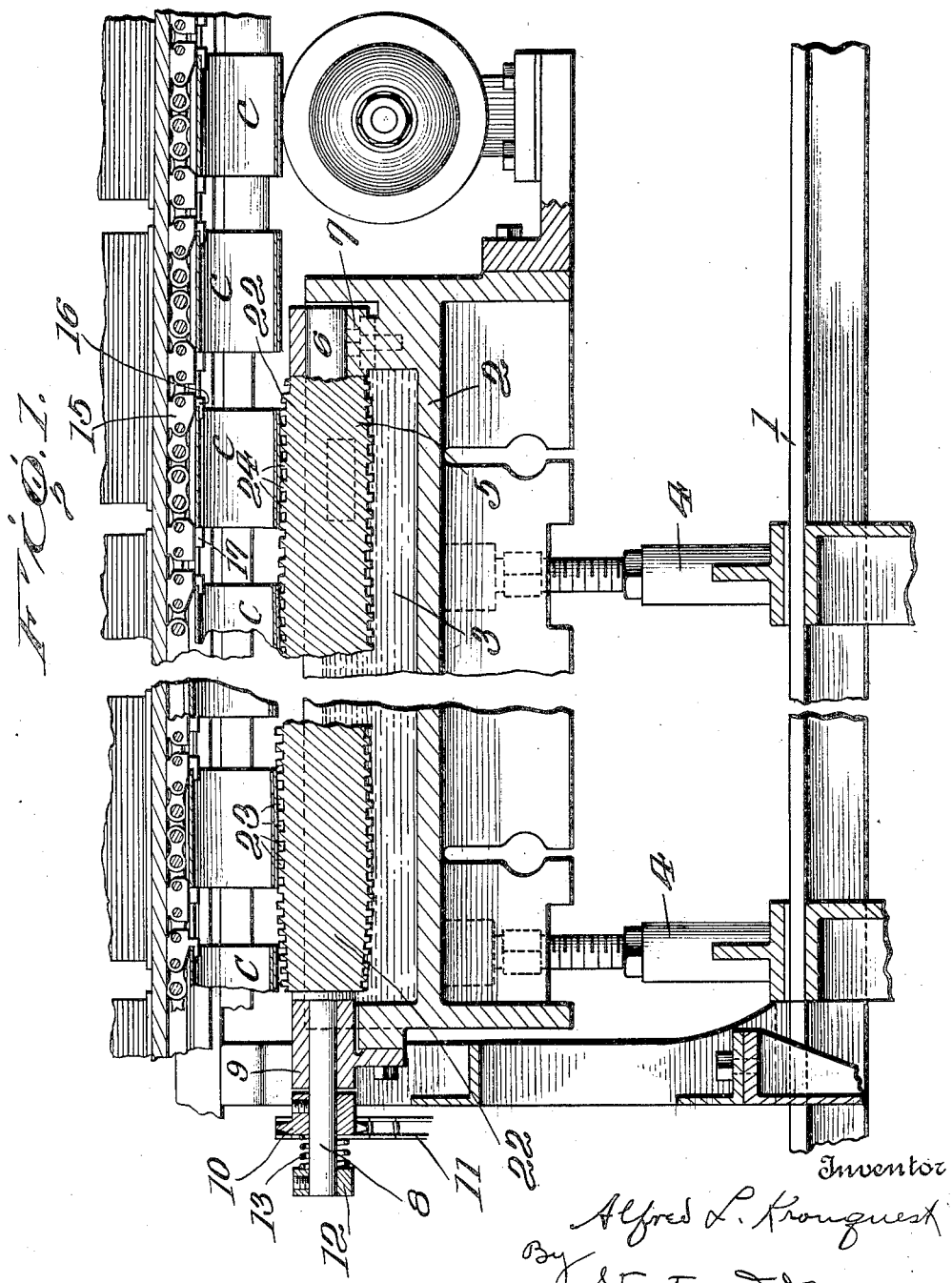

Dec. 4, 1923.
A. L. KRONQUEST
1,476,405
SOLDERING MECHANISM FOR CANS
Filed April 26, 1922  2 Sheets-Sheet 2
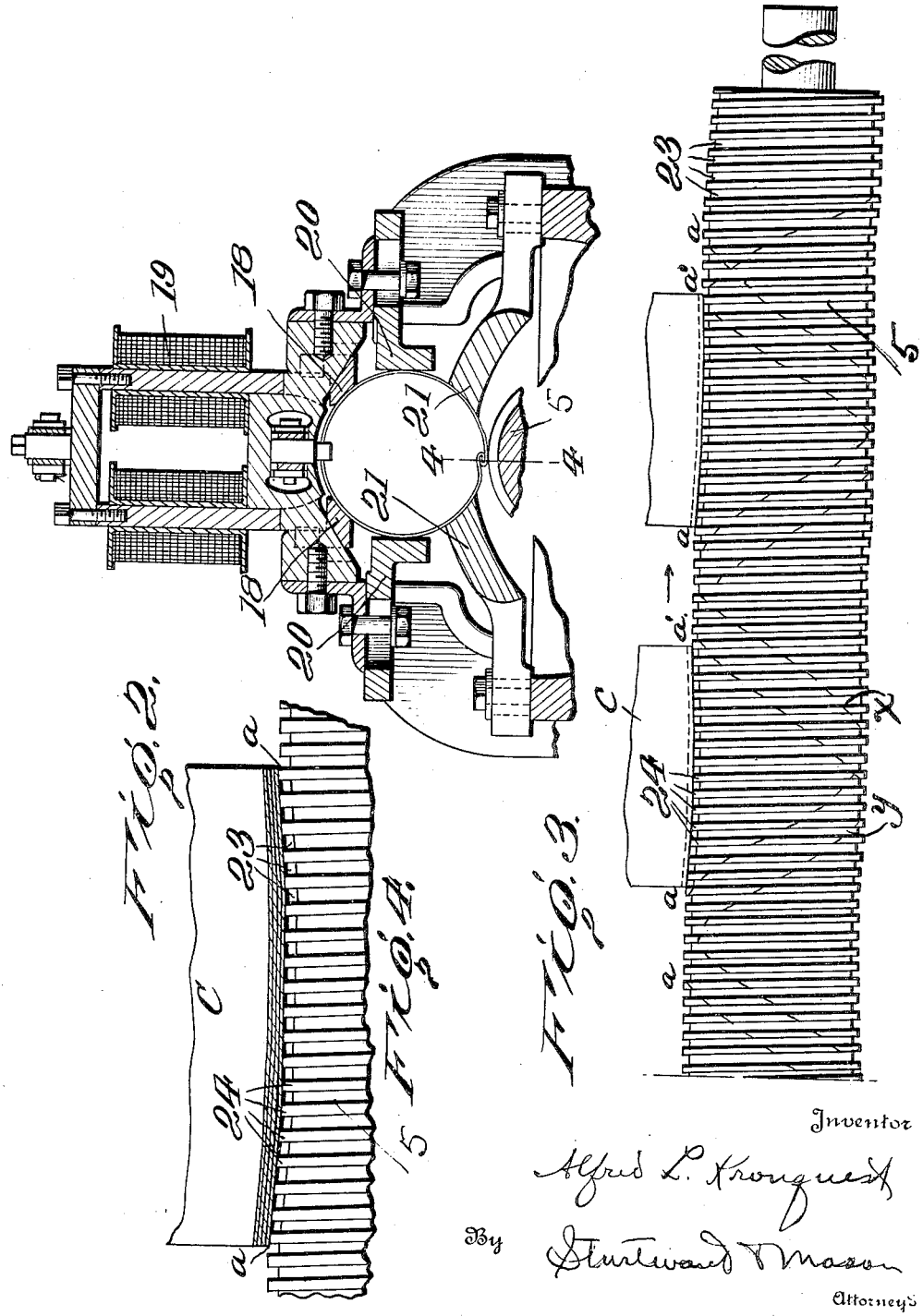
Inventor
Alfred L. Kronquest
By Sturtevant & Mason
Attorneys Patented Dec. 4, 1923.

1,476,405

UNITED STATES PATENT OFFICE.

ALFRED L. KRONQUEST, OF CHICAGO, ILLINOIS, ASSIGNOR TO CONTINENTAL CAN COMPANY, INC., OF SYRACUSE, NEW YORK, A CORPORATION OF NEW YORK.

SOLDERING MECHANISM FOR CANS.

Application filed April 26, 1922. Serial No. 556,690.

*To all whom it may concern:*

Be it known that I, ALFRED L. KRONQUEST, a citizen of the United States, residing at Chicago, in the county of Cook, State of Illinois, have invented certain new and useful Improvements in Soldering Mechanisms for Cans, of which the following is a description, reference being had to the accompanying drawing, and to the figures of reference marked thereon.

The invention relates to new and useful improvements in soldering mechanisms for cans, and more particularly to a soldering mechanism for soldering the side seam of a can.

It is well known that when the side seam of a can is being soldered that the side seam bows outwardly intermediate its ends by reason of the heat incident to the applying of the solder, and therefore, in using soldering irons, as heretofore formed, the central portion of the seam is likely to receive too much solder, while the end portions of the seam do not receive sufficient solder.

An object of the present invention is to provide a soldering roll which is shaped to conform to the side seam when bowed outwardly by the heat incident to soldering so that said roll makes uniform contact with the side seam throughout substantially its entire length.

A further object of the invention is to provide a soldering roll of the above character with a series of annular right-angled grooves which produce a longitudinally interrupted soldering surface so that the solder has a chance to drain off from the side seam at the end thereof.

A still further object of the invention is to provide a soldering iron of the above type with tapered ends so that a can body will gradually make contact therewith and will not come in contact with the soldering roll until said can body is completely over the roll.

These and other objects will in part be obvious and will in part be hereinafter more fully disclosed.

In the drawings which show by way of illustration a portion of the machine embodying the improvement—

Figure 1 is a longitudinal sectional view through the soldering bath, the solder roll, and the means for supporting and moving the can bodies along said soldering roll;

Fig. 2 is a transverse sectional view through the upper portion of the machine and the upper portion of the solder roll;

Fig. 3 is an enlarged view of a portion of the solder roll showing two can bodies moving along the same, and Fig. 4 is an enlarged sectional view through a portion of the roll of one of the can bodies showing the bowed side seam making uniform contact with the soldering roll.

The invention is directed broadly to a can body side seam soldering machine, and includes a solder bath in which is located a solder roll. This solder roll is only partly immersed in the solder bath and is rotated so that it becomes coated with solder. Means is also provided for moving the can bodies lengthwise of the soldering roll, so that the side seam may make contact therewith and have solder applied thereto.

It is well known that the side seam of a can body bulges or bows outwardly intermediate its ends when the metal forming the side seam is heated as a step incident to the applying of the solder to the side seam. One of the purposes of the present invention is to provide a soldering roll which is so shaped as to conform to this bowed condition of the side seam, so that said bowed side seam will make uniform contact with the soldering roll throughout its entire length and thus the solder will be uniformly applied to the side seam. This shaping of the roll is accomplished by forming a spirally laid concave surface which is of substantially the same length as the can body or slightly longer than the same, and said concave spiral is so formed that when the soldering roll is driven in proper timing and the can bodies moved lengthwise of the soldering roll, also in proper timing, the can bodies will be spaced one from another a slight distance and will follow the concave spiral so that a concave portion of the soldering roll is always presented to the bowed side seam.

The soldering roll is also provided with a series of closely spaced right-angled grooves, which interrupts the soldering surface and gives the solder a chance to flow away from the rear end of the side seam and thus prevents the solder from accumulating at the rear end of the seam in flowing up on to the inside of the can. The soldering roll is also tapered at its end so that the can body is well over the soldering roll before making contact with the soldering roll.

Referring more in detail to the drawings, the improved soldering machine includes the usual supporting frame 1 on which is mounted a tank 2. This tank 2 contains the solder bath which is indicated at 3. Said tank is preferably mounted upon adjustable supports 4, 4 so that the same may be raised or lowered to bring the solder roll mounted in the tank into proper contact with the side seam.

The solder roll is indicated at 5. Said solder roll is provided with a stub shaft 6 which is mounted in a bearing 7 located wholly within the tank and also with a stub shaft 8 which is mounted in a bearing 9 carried by the tank but so disposed that the stub shaft 9 extends to a point outside of the tank. On said stub shaft is a sprocket wheel 10 driven by a sprocket chain 11.

The can bodies are indicated at C. Said can bodies are carried through the machine by a traveling chain 15. Said traveling chain 15 is provided with a sustaining lug 16 and a pushing lug 17. The can bodies are supported by magnetic rails or tracks 18, 18 which are energized by magnetic coils 19. The can bodies are supported by these magnetic tracks and caused to slide along the same by the traveling chain. This conveying means forms no part of the present invention, but is shown, described and claimed in the application of Alfred L. Kronquest and Frank A. Assmann, Serial Number 529,147, filed January 14, 1922, and further description of these features is not thought necessary. It may be noted that the can body travels between adjustable side guides 20, 20, and is held in proper relation to the soldering roll by guides 21, 21.

The solder roll is partly immersed in the solder bath and is rotated. The solder roll will be coated with solder as it rotates, and this solder will be applied to the side seam. It is noted that the can bodies travel lengthwise of the solder roll. The solder roll is tapered at each end thereof as indicated at 22, and the purpose of tapering the solder roll is to permit the can body to move to a point well over the side of the roll before it makes contact therewith. The solder roll is also provided with a series of closely spaced right-angled grooves 23. This forms an interrupted soldering surface along which the side seam travels. When the surface is one continuous surface, the solder accumulates at the end of the side seam and often flows up and on to the inside of the can body, which, of course, is objectionable, as the can body is intended to be formed with a flange for double-seaming after it is soldered, and any accumulated solder at the end of the side seam or on the inside of the can body at the end of the side seam is very objectionable. By interrupting the soldering surface, the solder has a chance to drain off from the end of the side seam which prevents this objectionable accumulation.

As above noted, the side seam when heated incident to the applying of the solder, bows or buckles outwardly intermediate its ends, and if the soldering roll had a straight surface, it would make contact with the side seam intermediate its ends to a greater extent than at the ends, so that the solder would not be uniformly applied. To overcome this objection, the solder roll is provided with a concave surface 24. This concave surface extends from the point $a'$ to the point $a'$ in Figures 3 and 4, and the length of the concave surface is slightly longer than the length of the can being soldered. Said concave surface is also shaped to conform to the bowed side seam, so that the solder will be uniformly applied to the side seam. This concave surface in the soldering roll is spirally formed therein so that said roll may be timed to the endwise travel of the can body whereby the concave surface will follow the travel of the can body so that a concave surface is presented to the can body during the entire time that it is in contact with the solder roll. The high portions between the concave surface are indicated by the broken lines $x$ and $y$ in Fig. 3, which clearly shows how the concave surface is laid.

It will be noted from the above that a solder roll has been provided wherein the can body travels longitudinally of the roll, and at the same time the roll is shaped so as to present a surface to the side seam which is curved to conform to the bowing of the side seam, and this insures a uniform applying of solder throughout the entire extent of the side seam.

It is obvious that minor changes in the details of construction and the shaping of the parts may be made without departing from the spirit of the invention as set forth in the appended claims.

Having thus described the invention, what I claim as new and desire to secure by Letters Patent, is—

1. A solder machine including in combination, a solder bath, a solder roll disposed in said bath, means for rotating said soldering roll, and means for moving can bodies endwise of the roll as it rotates with the side seam of the can body positioned to make contact with the roll, said solder roll being shaped so as to make uniform contact with the side seam throughout its entire length when said side seam is bowed outwardly by the heat incident to soldering.

2. A solder machine including in combination, a solder bath, a solder roll disposed in said bath, means for rotating said soldering roll, and means for moving can bodies endwise of the roll as it rotates with the side seam of the can body positioned to make contact with the roll, said solder roll having a spirally laid concave portion conforming to the shape of the side seam when said side seam is bowed outwardly by the heat incident to soldering.

3. A solder machine including in combination, a solder bath, a solder roll disposed in said bath, means for rotating said soldering roll, and means for moving can bodies endwise of the roll as it rotates with the side seam of the can body positioned to make contact with the roll, said solder roll having a spirally laid concave portion conforming to the shape of the side seam when said side seam is bowed outwardly by the heat incident to soldering, said means for rotating the roll and for moving the can bodies being so timed as to continue to present said concave surface to the side seam of the can body.

4. A solder machine including in combination, a solder bath, a solder roll disposed in said bath, means for rotating said soldering roll, and means for moving can bodies endwise of the roll as it rotates with the side seam of the can body positioned to make contact with the roll, said solder roll being shaped so as to make uniform contact with the side seam throughout its entire length when said side seam is bowed outwardly by the heat incident to soldering, said soldering roll having a series of right-angled grooves forming a longitudinally interrupted soldering surface.

5. A solder machine including in combination, a solder bath, a solder roll disposed in said bath, means for rotating said soldering roll, and means for moving can bodies endwise of the roll as it rotates with the side seam of the can body positioned to make contact with the roll, said solder roll having a spirally laid concave portion conforming to the shape of the side seam when said side seam is bowed outwardly by the heat incident to soldering, said solder roll having a series of right-angled grooves forming a longitudinally interrupted soldering surface.

6. A solder machine including in combination, a solder bath, a solder roll disposed in said bath, means for rotating said soldering roll, and means for moving can bodies endwise of the roll as it rotates with the side seam of the can body positioned to make contact with the roll, said solder roll being shaped so as to make uniform contact with the side seam throughout its entire length when said side seam is bowed outwardly by the heat incident to soldering, said solder roll having its ends tapered so as to permit the can body to be wholly over the solder roll when in contact therewith.

7. A solder machine including in combination, a solder bath, a solder roll disposed in said bath, means for rotating said soldering roll, and means for moving can bodies endwise of the roll as it rotates with the side seam of the can body positioned to make contact with the roll, said solder roll having a spirally laid concave portion conforming to the shape of the side seam when said side seam is bowed outwardly by the heat incident to soldering, said solder roll having its ends tapered so as to permit the can body to be wholly over the soldering roll when making contact therewith.

8. A solder machine including in combination, a solder bath, a solder roll disposed in said bath, means for rotating said soldering roll, and means for moving can bodies endwise of the roll as it rotates with the side seam of the can body positioned to make contact with the roll, said solder roll having a spirally laid concave portion conforming to the shape of the side seam when said side seam is bowed outwardly by the heat incident to soldering, said means for rotating the roll and for moving the can bodies being so timed as to continue to present said concave surface to the side seam of the can body, said solder roll having its ends tapered so as to permit the can body to be wholly over the solder roll when making contact therewith.

In testimony whereof, I affix my signature.

ALFRED L. KRONQUEST.